F. WESTERMAN.
DEPOSITING MACHINE.
APPLICATION FILED APR. 12, 1918. RENEWED JUNE 5, 1922.
1,434,175.
Patented Oct. 31, 1922.
9 SHEETS—SHEET 1.
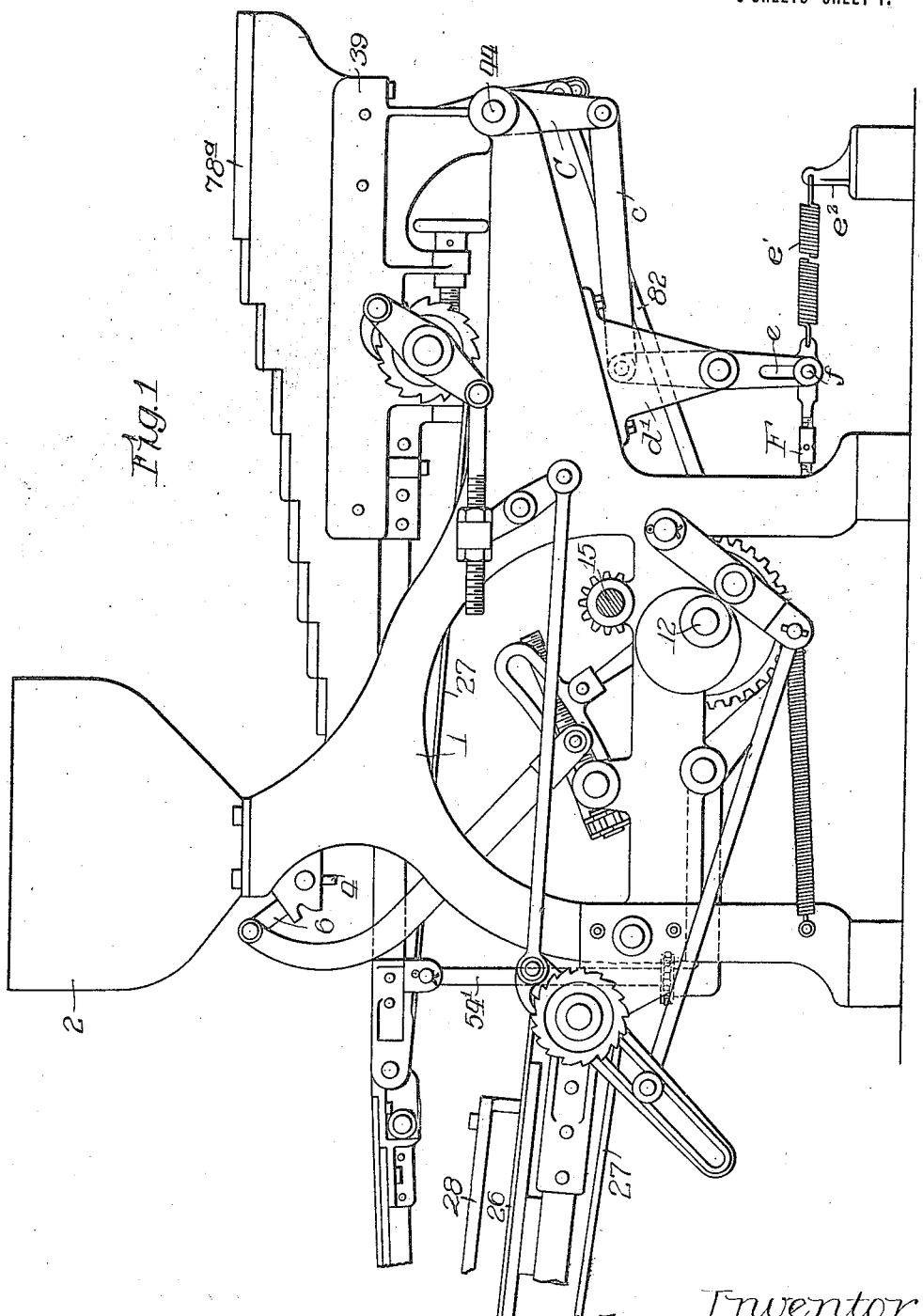

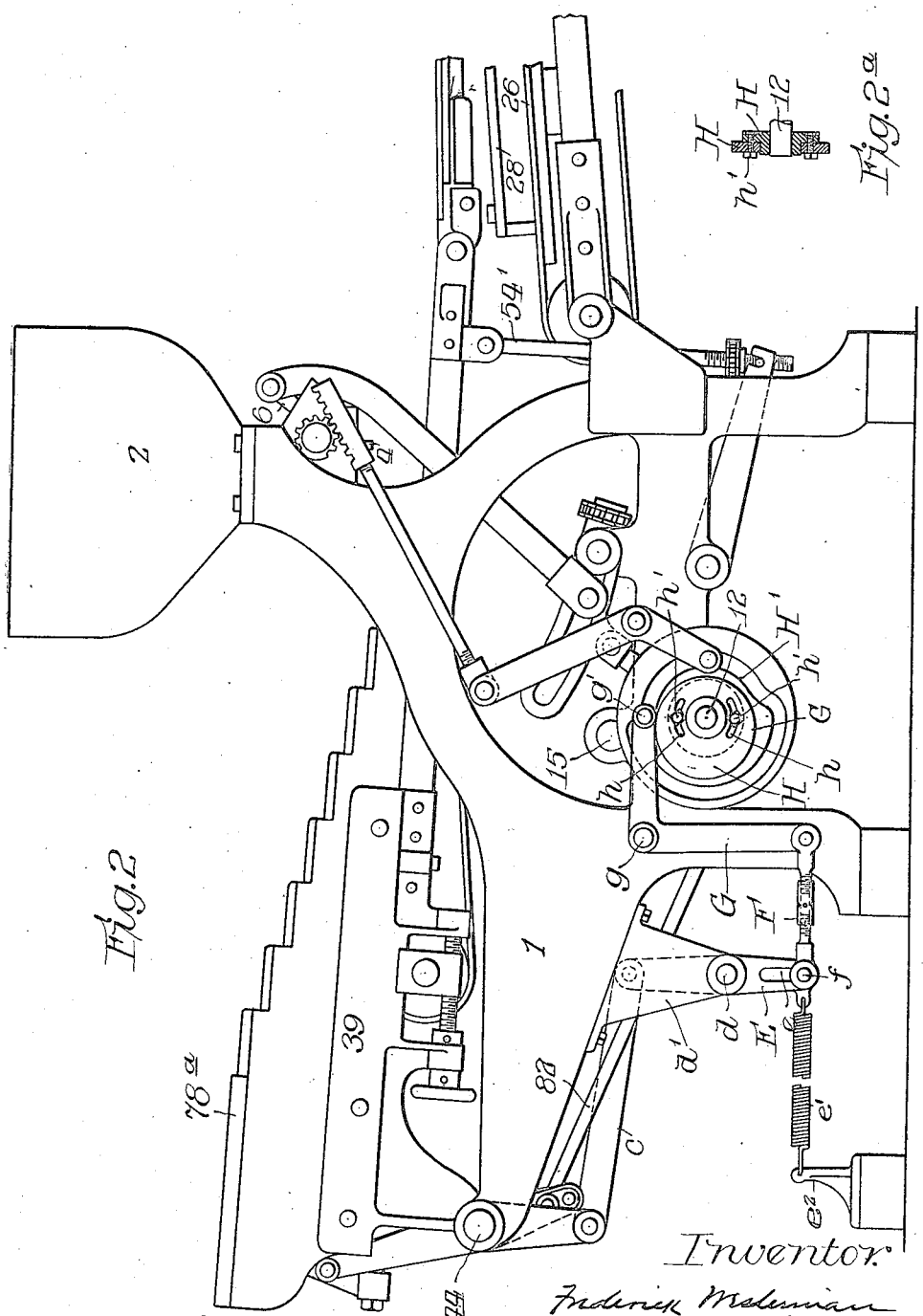

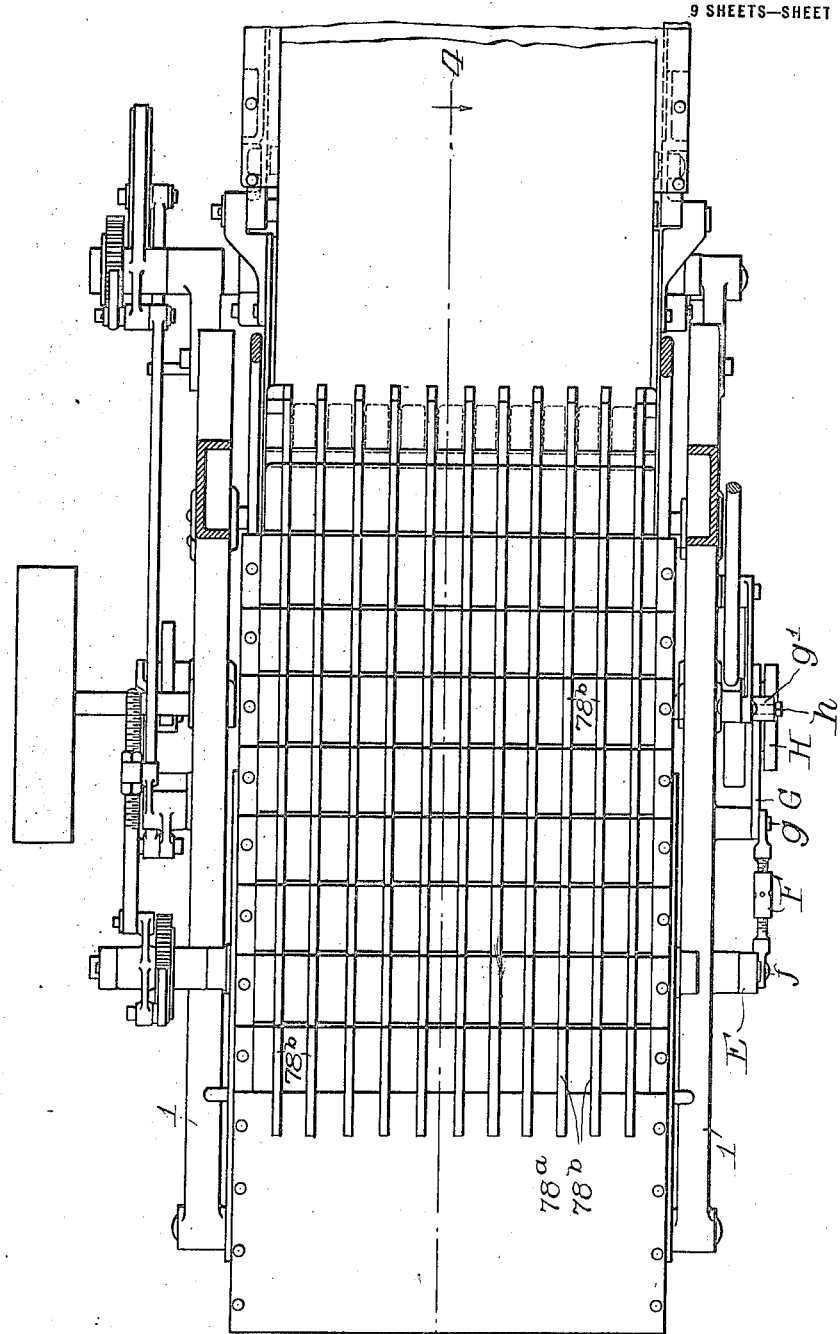

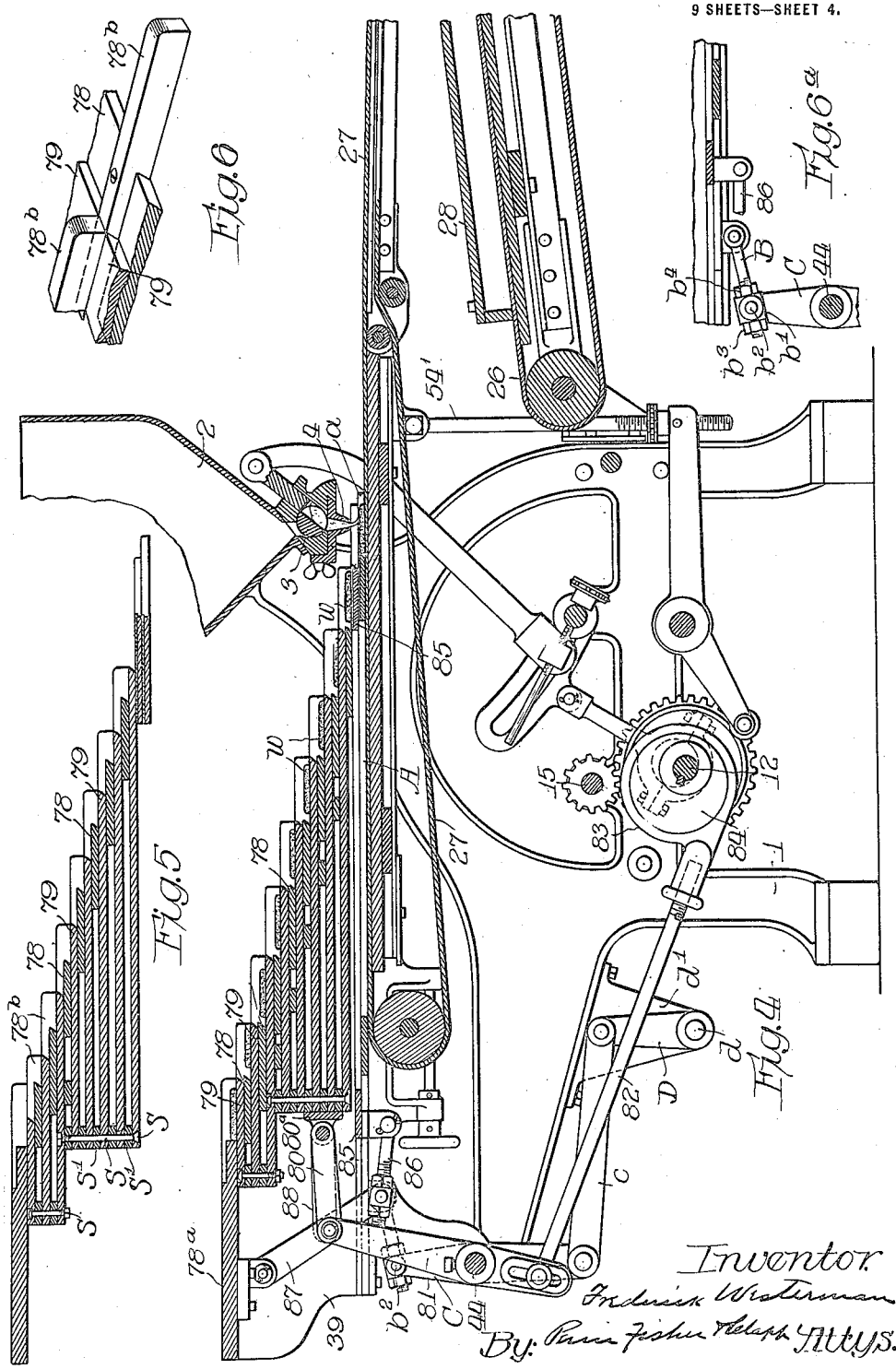

F. WESTERMAN.
DEPOSITING MACHINE.
APPLICATION FILED APR. 12, 1918. RENEWED JUNE 5, 1922.
1,434,175. Patented Oct. 31, 1922.
9 SHEETS—SHEET 5.
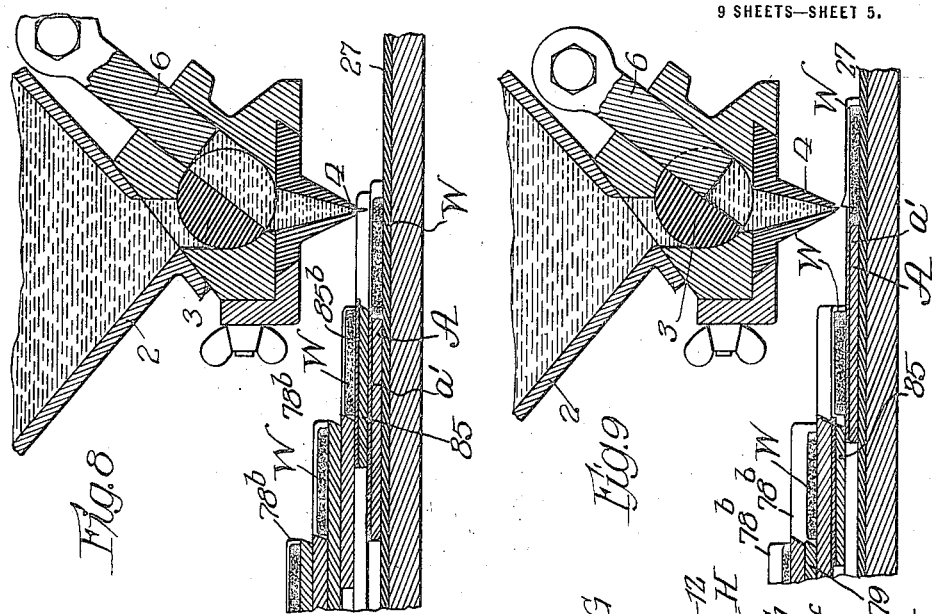
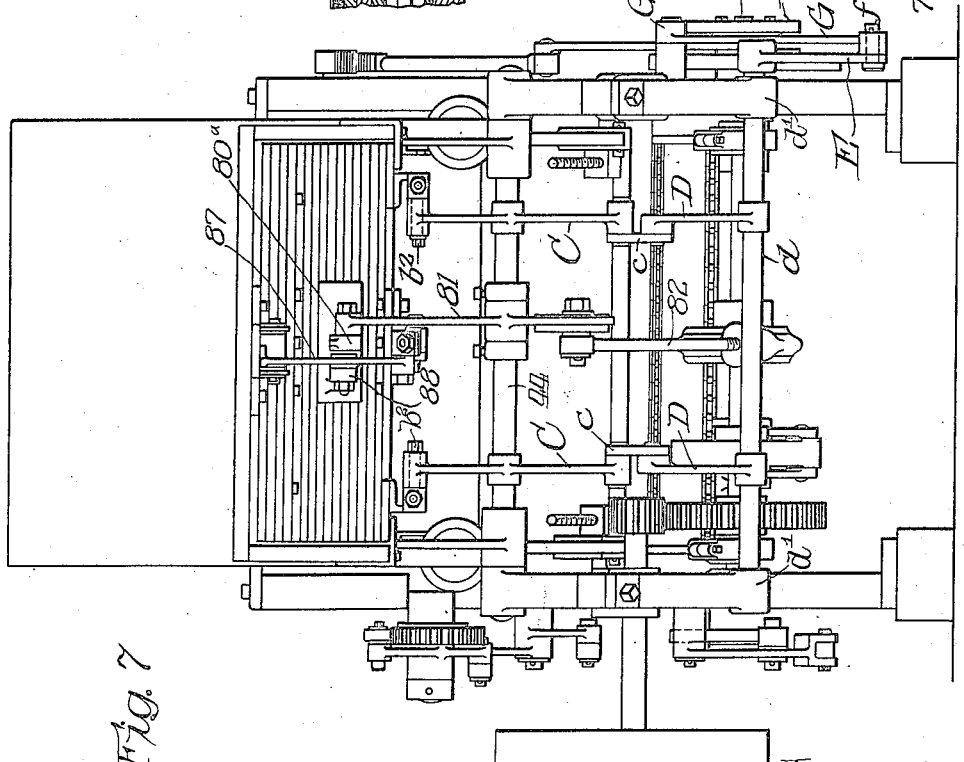
Inventor
Frederick Westerman
By: Price Fisher & Clapp
Attys.

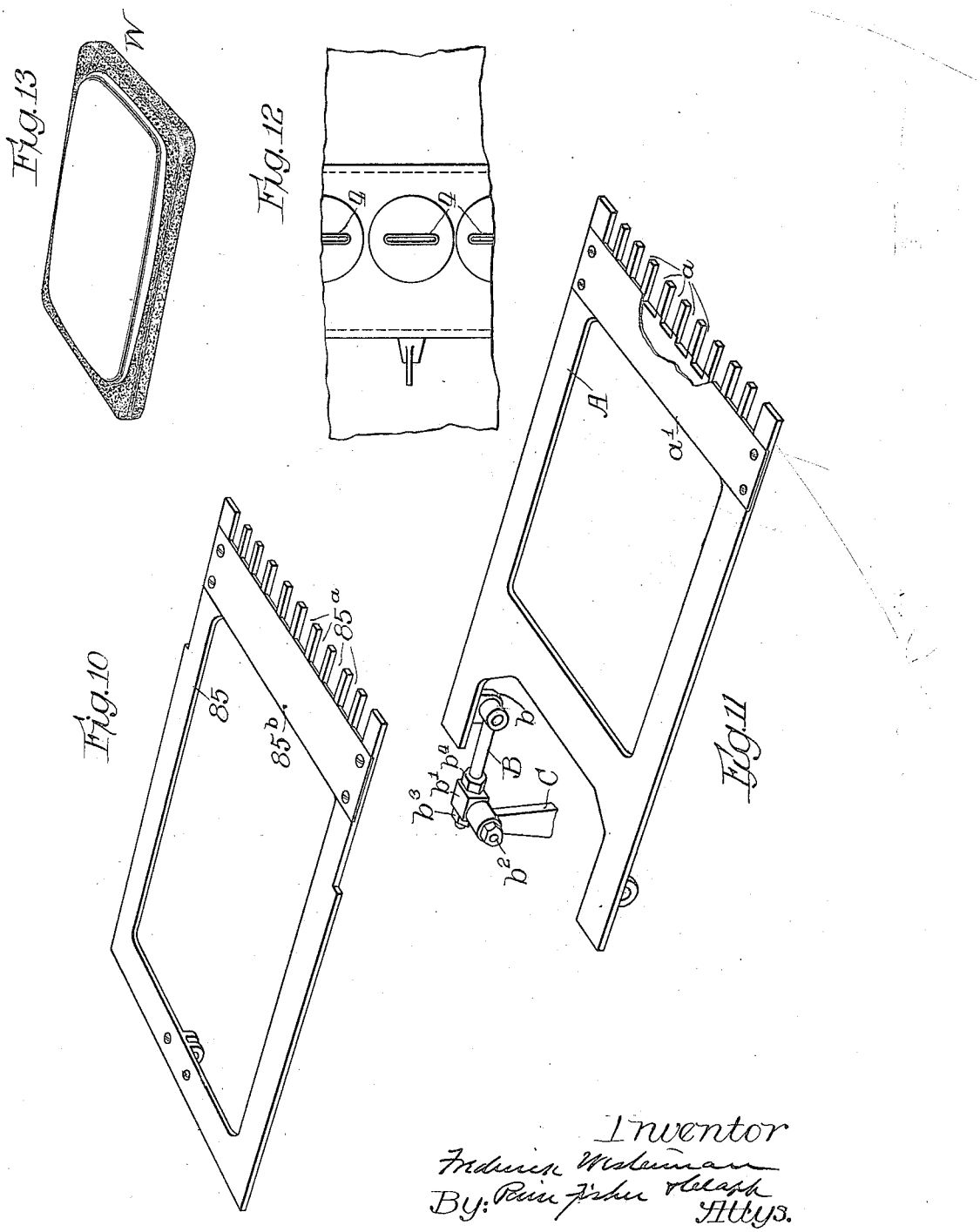

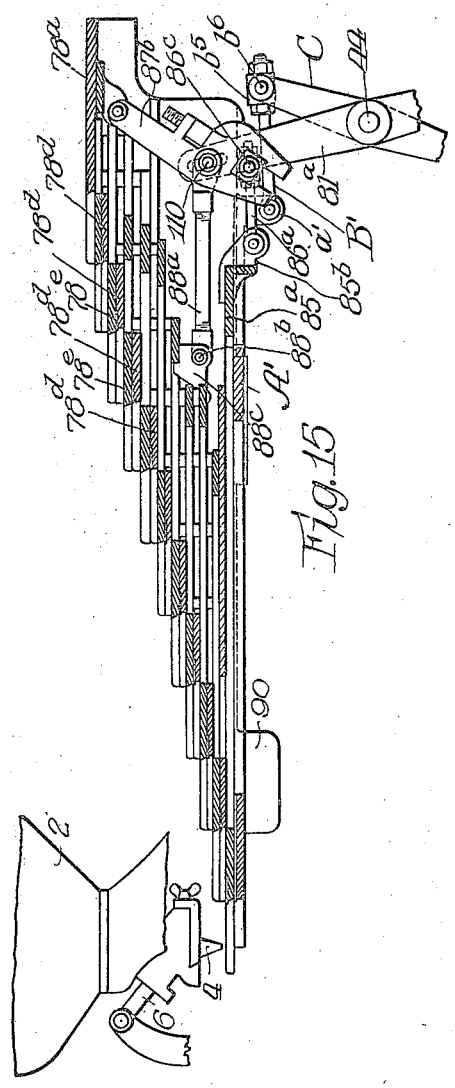

F. WESTERMAN.
DEPOSITING MACHINE.
APPLICATION FILED APR. 12, 1918. RENEWED JUNE 5, 1922.
1,434,175.
Patented Oct. 31, 1922.
9 SHEETS—SHEET 8.
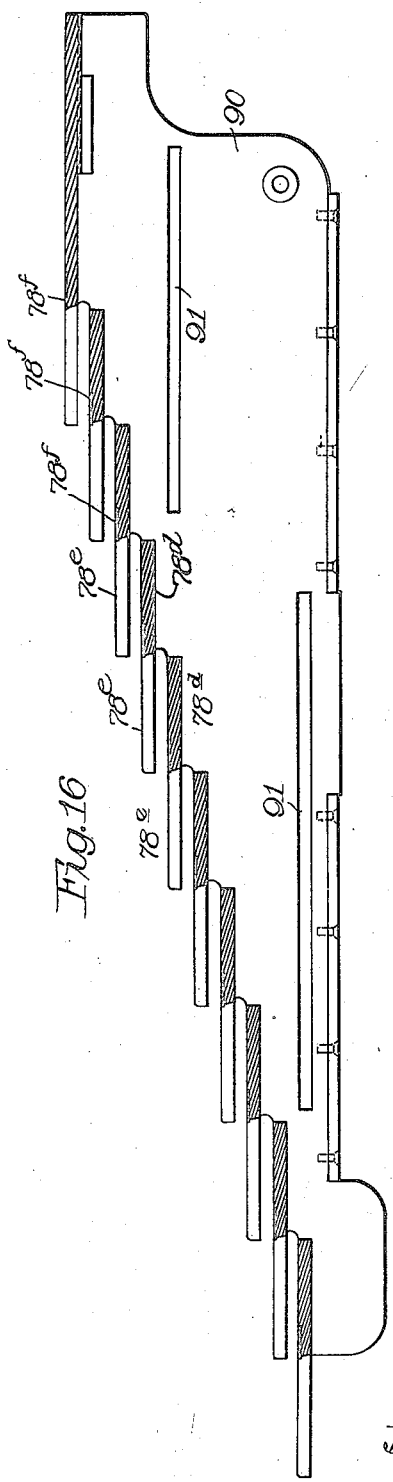
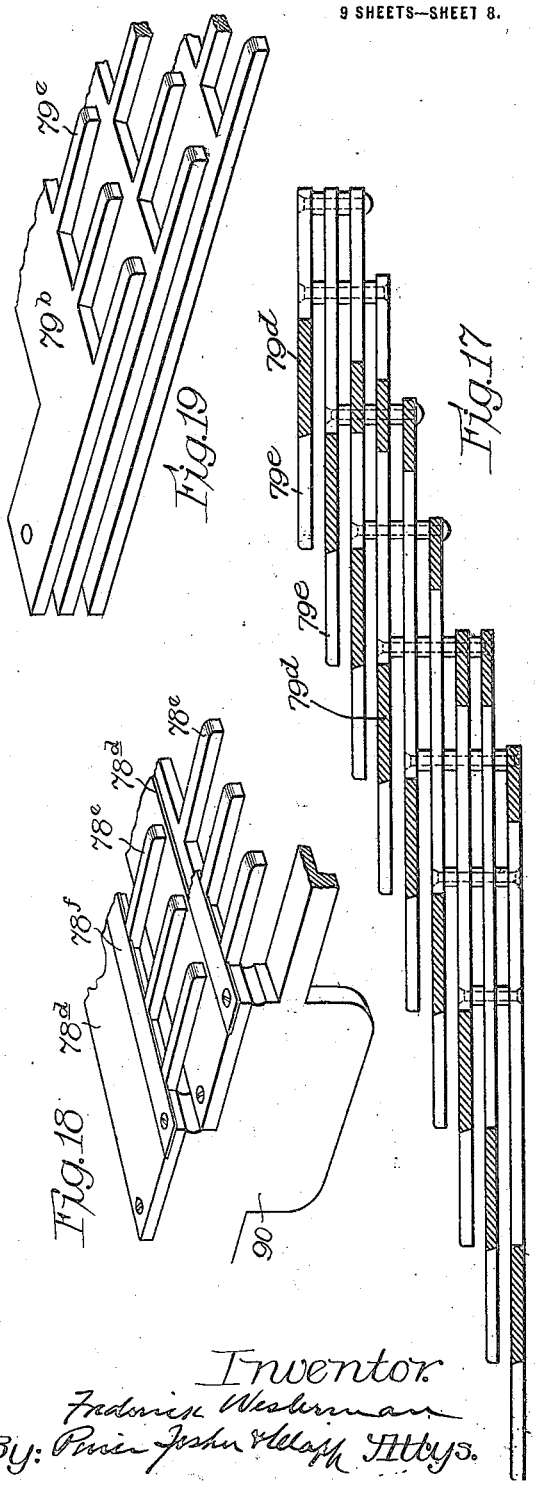
Inventor.
Frederick Westerman
By: Prior Joshua & Adolph Attys.

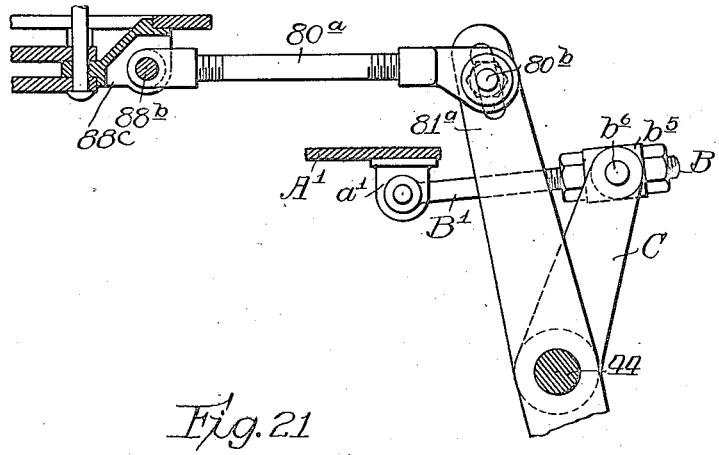
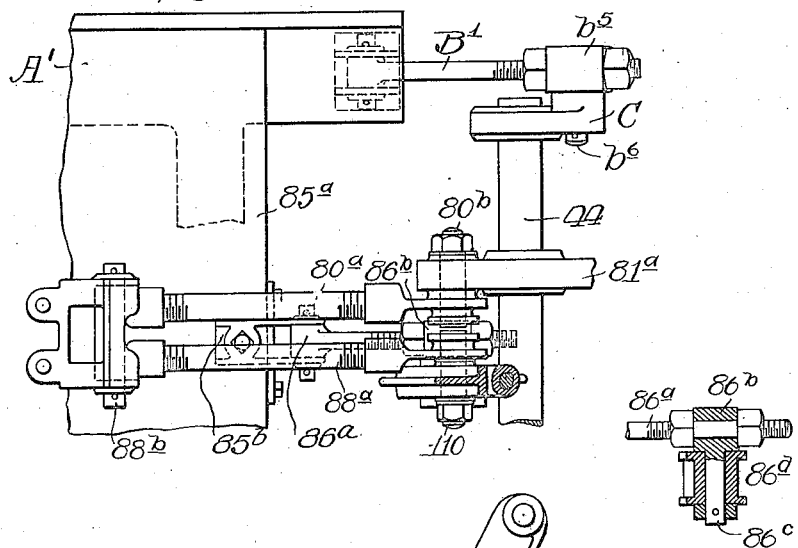
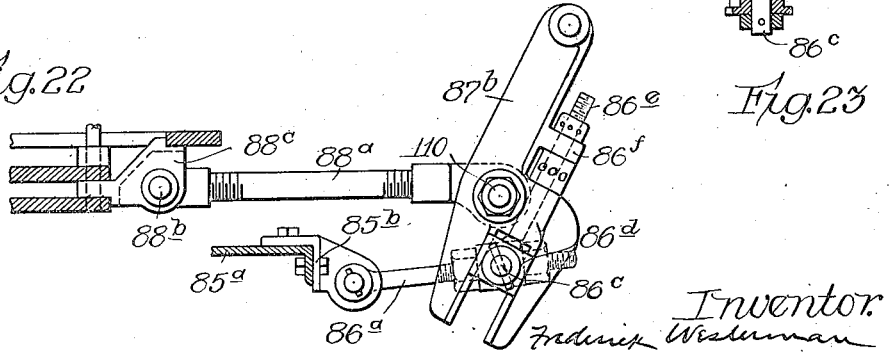

Patented Oct. 31, 1922.

1,434,175

UNITED STATES PATENT OFFICE.

FREDERICK WESTERMAN, OF CHICAGO, ILLINOIS.

DEPOSITING MACHINE.

Application filed April 12, 1918, Serial No. 228,255. Renewed June 5, 1922. Serial No. 565,893.

*To all whom it may concern:*

Be it known that I, FREDERICK WESTERMAN, a citizen of the United States, residing at Chicago, in the county of Cook and State of Illinois, have invented certain new and useful Improvements in Depositing Machines, of which I do declare the following to be a full, clear, and exact description, reference being had to the accompanying drawings, forming a part of this specification.

The invention has relation more particularly to depositing machines of the kind designed to deposit marshmallow, chocolate, frosting, or similar substances, on the surface of cakes or the like, and the invention consists in the novel features of construction hereinafter described, illustrated in the accompanying drawings and particularly pointed out in the claims at the end of this specification.

In reissued Letters Patent No. 13,999, granted to me October 19, 1915, there is shown a depositing machine of the character to which my invention more particularly relates, and as much of the structure hereinafter described is fully set forth in said reissued Letters Patent, reference thereto may be had for a better understanding of the general features of construction of the present machine.

In the drawings, Fig. 1 is a view in elevation of one side of my improved machine, portions being omitted. Fig. 2 is a view in elevation from the opposite side of the machine. Fig. 2ª is a detail view showing the manner of attaching the cam H to the shaft 12. Fig. 3 is a plan view. Fig. 4 is a view in vertical section on line 4—4 of Fig. 3. Fig. 5 is a view in vertical longitudinal section through the feed mechanism in different position from that shown in Fig. 4. Fig. 6 is an enlarged detail perspective view of a portion of the feed mechanism. Fig. 6ª shows in detail parts shown in Fig. 4. Fig. 7 is a view in front elevation. Fig. 8 is an enlarged detail view in vertical section through the lower part of the receptacle for the coating material and adjacent portions of the feed mechanism. Fig. 9 is a view similar to Fig. 8 but showing the parts in different position. Fig. 10 is a detail perspective view of one of the lowermost pushers or feeders. Fig. 11 is a detail perspective view of another of the lowermost pushers or feeders showing part of its actuating mechanism. Fig. 12 is an enlarged inverted plan view showing a part of the elongated nipples or orifices below the receptacle for marshmallow or the like. Fig. 13 is a perspective view showing an elongated cake having its coating of marshmallow or the like. Fig. 14 is a plan view illustrating a modified form of the fixed steps and two lowermost pushers of the feeding mechanism. Fig. 15 is a view in vertical section on line 15—15 of Fig. 14, the receptacle for marshmallow, etc.,—being also shown in section. Fig. 16 is an enlarged view of one of the side frames of the feeding mechanism, the stationary feed steps being shown in section. Fig. 17 is an enlarged view in vertical section through the movable feed steps or feeders. Fig. 18 is a perspective view showing the front portions of two adjacent fixed steps of the feed mechanism, the movable steps being omitted. Fig. 19 is a perspective view showing a portion of the front ends of adjacent movable steps or feeders, the fixed steps being omitted. Fig. 20 is an enlarged detail view of the mechanism shown in Fig. 15 for operating the lowermost feeder or pusher and the group of movable steps or feeders. Fig. 21 is a plan view of the part of the mechanism operating the group of movable steps and the two lowermost pushers or feeders. Fig. 22 is a detail view showing certain parts of the mechanism for operating the next to the lowermost pusher and the group of movable feed steps. Fig. 23 is a detail view in section showing the mechanism for adjusting the throw of the pusher or feeder 85ª.

The main frame 1 of the machine is shown as of the same construction as that set forth in my above mentioned reissued Patent No. 13,999. So, also, the receptacle 2 for the marshmallow or other coating material, the valve 3 for controlling the flow of material through the nipples or orifices 4 at the bottom of said receptacle, the plungers 6, and mechanism for operating these parts, may be the same as in my aforesaid patent, the valve 3 and plunger 6 being operated from the shaft 12 and main drive shaft 15, as in the machine of said patent.

Similarly, also, the cakes W to be coated are received upon an endless carrier belt 27 and delivered therefrom to trays or drying boards 28 carried by an endless belt 26 (see Fig. 4), the endless carrier 27 passing over a buckling frame that is raised or lowered by rods 54', the operation of the carrier belts 26 and 27 and the raising and lowering of the buckling frame through the medium of the rods 54' being effected as in the machine of my above mentioned patent.

While my present invention is adapted for use in connection with various means for initially advancing the cakes to be coated, I prefer to employ sets of alternately arranged superposed steps by which the cakes may be delivered in rows beneath the orifices 4 of the receptacle 2 through which the coating material will be delivered onto the surface of the cakes. The initial feeding mechanism shown comprises relatively fixed and movable steps 78 and 79 (see Figs. 4, 5 and 6) which are preferably mounted upon the carrier frame section or bed 39. Both sets of steps oscillate with the frame section 39 about the shaft 44, as the inner end of the frame section is raised and lowered by the rods 54'. The relatively movable steps are also reciprocated to move the cakes over the relatively fixed steps 78 and advance them towards the depositing device, these fixed steps 78 being secured together but arranged with spaces between them to admit the reciprocating steps or feeders 79. These latter steps or feeders 79 are shown as comprising long bars or slats that are bolted together as at S, with interspacing strips S'. These reciprocating steps or feeders 79 move between the fixed steps 78 above and below them, respectively, and also between guides or fingers 78$^b$ that are secured to and extend over the upper faces of the fixed steps 78 and project outwardly, as shown, from the front edges of the steps 78. Each of the guides or fingers 78$^b$ is preferably formed, as shown in Figs. 4, 5 and 6, that is to say, with a shallow part extending over the top of the fixed step to which it is secured and with a deeper portion extending downwardly across the front edge of said step. The guides or fingers 78$^b$ are in alinement so that they insure the accurate guiding of the cakes from the platform 78$^a$ to the bottom of the feeding mechanism. The movable steps or feeders 79 are connected by a link 80 to the upper end of an oscillating arm or lever 81 which is mounted upon a cross shaft 44. An eccentric rod 82 is adjustably connected to the lower slotted end of this arm or lever 81 and is provided at its forward end with a strap 83 which engages an eccentric 84 on the shaft 12. Beneath the series of steps 78 and 79 is arranged a feeding device 85 that is also reciprocated but is not bolted to the other reciprocating steps. (See Figs. 4, 8 and 10). This feeding device 85 is connected at its outer end by an adjusting link 86 to the lower end of an arm 87, the upper end of which is pivoted to the under side of the uppermost stationary step or platform 78$^a$ and is also connected by a link 88 to the bracket 80$^a$ on the series of reciprocating steps. By this mechanism, which is substantially the same as in my above mentioned reissued patent, the throw of the feeding device 85 is nearly twice as great as that of the other reciprocating steps 79.

In order to space the lower cakes at proper distances apart so that they will be accurately brought in front of the nozzles 4 through which the coating material will be discharged onto the cakes, I have shown the end of the feeding device 85 (see Figs. 3 and 10) as provided with a series of oblong pockets 85$^a$, each pocket being adapted to receive a cake, and on the top of this end of the feeding device is preferably arranged a transverse guard plate or metal strip 85$^b$ (see Fig. 10) that extends slightly over the ends of the pockets 85$^a$ so as to prevent the tipping or tilting of the cakes.

Beneath the feeding device 85 and between said device and the endless carrier 27, is arranged the pusher or supplemental feeding device which constitutes the main feature of the present invention. This supplemental feeding device (see Figs. 4, 8, 9 and 11) is shown as comprising a frame or plate A, the feeding end of which is preferably provided with a series of cake-receiving pockets $a$ and with a guard plate or stripper $a'$ extending over the inner ends of said pockets, the end of this supplemental feeding device being similar to the corresponding end of the feeding device 85 last described, the guard plate or stripper $a'$ serving to effectively hold the cakes while the coating material is being applied thereto and to strip or pull away the cakes from the nozzles as the table is lowered. A function of this supplemental feeding device A is to gradually advance the cakes beneath the feeding nozzles 4 as the coating material is discharged from said nozzles onto the upper surfaces of the cakes.

In the machine of my above mentioned reissue Letters Patent No. 13,999, there is no relative movement between the feeding mechanism and the receptacle from which the marshmallow or like material is ejected for moving the cakes as they are being coated, the cakes remaining stationary during the coating operation. In my present invention, I contemplate that there shall be a relative movement between the cakes that are being coated and the nozzles through which the coating material is ejected onto the cakes, and preferably this is accomplished by advancing the cakes during the coating operation so that the coating material may be spread in sheets over the upper surfaces of oblong cakes. By reference more particularly to Fig. 12, it will be seen that the discharge orifices 4, from which the marshmallow or like material is ejected, are narrow orifices of oblong shape, the length of the orifices corresponding to the width of the cakes to be coated.

I prefer to actuate the supplemental feeding device A by the mechanism next to be described: Adjacent the outer end of the frame A (see Fig. 11) are depending lugs to which are pivotally connected, as at $b$, the inner ends of the rods B, the outer ends of these rods preferably passing through the heads $b'$ of pins $b^2$ and being adjustably connected to the heads $b'$ by nuts $b^3$ and $b^4$ engaging the threaded portions of the rods B. The pins $b^2$ pass through the upper ends of the rock arms C mounted on the shaft 44 (see Figs. 4 and 11) and the lower ends of the rock arms C are pivotally connected by links $c$ to the upper ends of the rock arms D mounted upon a rock shaft $d$ that is journaled in brackets $d'$ (see Figs. 4 and 7) bolted to and depending from the sides 1 of the main frame at its front end. One end of the rock shaft $d$ extends outside the adjacent bracket $d'$ (see Fig. 2) and has fixed thereon an arm E having a slot $e$ therein, in which slot works a pin $f$ that is suitably linked, as by an adjustable turnbuckle F, to the lower end of the elbow lever G, that is pivotally mounted, as at $g$, to a stud projecting outwardly from the main frame of the machine. The upper end of the elbow lever G carries a pin $g'$ preferably furnished with a friction roll or sleeve adapted to bear against the periphery of an eccentric or cam H that is mounted upon the outer end of the shaft 12 (see Figs. 2 and 2$^a$). Preferably, this cam H is adjustably mounted upon the shaft 12 and encircles the hub of a plate H' that is fixed to the shaft and is provided with slots $h$ to receive the set screws or bolts $h'$ by which the cam H can be adjustably connected to the plate H'. This adjustment of the cam or eccentric H enables the movement of the supplemental feeding device A to be accurately timed with respect to the operation of the means by which the coating material is delivered to the surface of the cakes and the turnbuckle F enables the throw of the supplemental feeding device A to be accurately determined. These features are important in enabling the machine to be employed for cakes of various sizes. For holding the roller on the pin $g'$ against the cam H a spring $e'$ is connected at one end to a lug on the lower end of the arm E and at the other end to a fixed member, as for example, the bracket $e^2$.

The operation of the machine, except as to the feature of the supplemental feeding device or mechanism by which the cakes are advanced beneath the discharge orifices during the coating of the cakes, is in the main as in the machine set forth in my above mentioned reissued Letters Patent. That is to say, the cakes are placed in a pile on the platform 78$^a$ and the operators arrange them in rows in the pockets formed by the fingers 78$^b$ that project from the edges of the stationary steps 78. The movable steps 79, the feeding device 85 and the supplemental feeding device A are reciprocated by the mechanism described, and this action will cause the cakes to move forwardly down the steps, dropping from one to another, until from the feeding device 85 they are dropped onto the guard plate or metal strip $a'$ of the supplemental feeding device A, at which time the inner edge of this guard strip $a'$ will be at the extreme of its inward movement, as indicated in Fig. 9 of the drawing. As the supplemental feeding device A is retracted, as shown in Fig. 8, it will cause the cakes to drop therefrom onto the carrier belt 27 and into the pockets $a$ at the inner end of the supplemental feeding device, so that when the supplemental feeding device is again moved inwardly towards the position shown in Fig. 9, the cakes will be forced beneath the discharge nozzles or orifices 4 through which the coating material will be delivered onto the surface of the cakes. The relative movement of the valve 3 and plungers 6 at the bottom of the receptacle 2 and the movement of the supplemental feeding device A are so timed that as soon as the plungers 6 begin to force the coating material onto the surface of the cakes, the supplemental feeding device A will push the row of cakes forward and thus cause the coating material to be distributed in even layers over the surface of the cakes, as indicated in Fig. 9. At the beginning of this operation of applying the coating to the cakes, the endless carrier 27 will be raised to bring the cakes in proximity to the lower ends of the nozzles 4, and when the proper amount of material has been delivered onto the surface of the cakes and the forward movement of the supplemental feeding device A is arrested, the endless carrier 27 will be lowered so as to break the stream of coating material and the endless carrier will then be advanced and so move the cakes from beneath the orifices 4.

The mechanism for imparting a step-by-step movement to the endless carrier 27 and to the endless carrier 26 and the trays mounted thereon, being the same as in the machine of my hereinbefore mentioned reissued Letters Patent, need not be specifically described.

In Figs. 14 to 22 of the drawings, I have shown another and what I regard as the preferred mechanism for effecting the feeding of the cakes. Referring to these figures of the drawings, a series of superposed, alternately fixed and movable steps are preferably employed. The fixed steps 78$^d$ are suitably secured at their ends to side frames and each of these fixed steps is preferably formed of a metal plate (preferably aluminum) with forwardly projecting fingers 78$^e$, these fingers being at proper distances apart to form pockets for oblong cakes. The fixed steps 78$^d$ are spaced at such distances apart as to properly receive the movable steps 79$^d$ that are formed preferably of aluminum, and with fingers 79$^e$ projecting from their front edges, in correspondence with the fingers 78$^e$ of the fixed steps 78$^d$. As shown, the movable steps 79$^d$ are formed with rearward extensions and are connected together by vertical bolts and spacing sleeves (see Figs. 15 and 17). The groups of movable pushers are suitably sustained by guide rails 91 projecting inwardly from the side frames 90 and when the movable steps or feeders are in position for use, they will alternate with the fixed steps 78$^d$, more clearly shown in Fig. 15 of the drawings. Each of the fixed steps 78$^d$ is shown as having its front edge beveled or inclined and is provided at the top of its front edge with a guard plate 78$^f$, to more effectively hold the cakes during the feeding operation.

The preferred means for operating the feeding mechanism is illustrated in Figs. 15 to 23 of the drawings, this mechanism differing somewhat from that hereinbefore described. As shown, the lowermost feeder or pusher designated as A′ has connected to the rear ends thereof brackets $a'$ to which are pivotally connected the inner ends of the rods B′. The outer threaded end of each of these rods B′ passes through a hole formed in the square head $b^5$ of the pin $b^6$ to which they are adjustably connected by nuts. Each of the pins $b^6$ passes through an opening at the upper end of a rock lever C that is mounted upon the rock shaft 44, as in the construction hereinbefore described.

The feeder or pusher 85$^a$ (see Fig. 22) immediately above the lowermost pusher A′ has centrally connected to its rear edge a bracket 85$^b$ to which is pivotally connected the inner end of a threaded rod 86$^a$ (see Fig. 23) that passes through and is adjustably connected to the headed end 86$^b$ of a pin or bolt 86$^c$. This pin or bolt 86$^c$ passes through an adjustable block 86$^d$ that is formed at the lower end of a threaded bolt 86$^e$ that passes upward through the rearward extensions 86$^f$ on an arm 87$^b$ that is pivotally connected to a bracket secured to the under side of the uppermost stationary step 78$^a$ (see Fig. 15). The lower end of the arm 87$^b$ is yoke-shaped to receive the adjustable block or head 86$^d$ at the end of the bolt 86$^e$, this bolt being provided with an adjusting nut or nuts whereby its position may be determined. By adjusting the bolt 86$^e$, the block or head 86$^d$ may be moved nearer to or farther from the lower end of the arm 87$^b$ so as to vary the throw of the pusher 85$^a$. Through the arm 87$^b$ passes a pin 110 to which is pivotally connected the outer end of a rod 88$^a$, the inner end of this rod being pivotally connected to a bolt 88$^b$ carried by a bracket 88$^c$ that will be secured to the group of movable steps, as shown in Fig. 15 of the drawings. To this same bolt 88$^b$ is also pivotally connected the inner end of a link 80$^a$, the outer end of which is pivotally connected to a pin 80$^b$ that passes through the slotted upper end of the rock lever 81$^a$ that is mounted on the rock shaft 44. The bolt 80$^b$ can be adjusted at different points within the slotted end of the rocking lever 81$^a$, for purposes of adjustment. (See Fig. 20).

So far as I am aware, my invention presents the first instance of a depositing machine of the character described, in which provision is made for advancing the cakes to be coated while the material, such as marshmallow, chocolate or the like, is being deposited upon the upper surface of the cakes, and while I have described what I regard as the preferred embodiment of the invention, I do not wish the broad features of the invention to be understood as limited to the details of structure hereinbefore set forth, as these may be varied within wide limits without departing from the spirit of the invention.

What I claim as new and desire to secure by Letters Patent is—

1. In a depositing machine, the combination with a receptacle for marshmallow or the like, having discharge nipples and with intermittently operated means for forcibly ejecting material through said nipples, of feeding mechanism for advancing rows of cakes beneath said nipples comprising a reciprocating pusher and means for effecting a relative movement between said pusher and said nipples while the marshmallow is being forcibly ejected through the nipples onto the cakes.

2. In a depositing machine, the combination with a receptacle for marshmallow or the like, provided with discharge nipples and with intermittently operated means for forcibly ejecting material through said nipples, of means for initially feeding rows of cakes to a position in advance of said nipples, a supplemental reciprocating pusher for advancing the rows of cakes beneath said nipples, and means whereby the discharge of marshmallow through said nipples is effected while the supplemental pusher is moving the cakes beneath said nipples.

3. In a depositing machine, the combination with a receptacle for material to be deposited and with means for discharging material from said receptacle, of means for feeding the cakes in rows to receive said material comprising a reciprocating pusher for advancing rows of cakes and mechanism timed to cause said pusher to move each row of cakes while the material is being deposited thereon.

4. In a depositing machine, the combination with a receptacle for the material, to be deposited and with means for intermittently discharging material from said receptacle, of means for feeding cakes or the like in rows beneath said receptacle, said feeding mechanism comprising an endless carrier belt, a reciprocating pusher for advancing rows of cakes beneath said receptacle, and driving mechanism timed to cause said pusher to advance the rows of cakes beneath said receptacle while the material is being deposited upon the cakes and to cause said pusher to be retracted while the discharge of material from said receptacle is arrested.

5. In a depositing machine, the combination with a receptacle for material to be deposited and with means for delivering material from said receptacle, of means for feeding cakes or the like in rows beneath said receptacle, said feeding means comprising initial feeding mechanism for lining up the rows of cakes in front of the discharge orifices of said receptacle, and a supplemental feeder for advancing the rows of cakes beneath the discharge orifices of said receptacle, said supplemental feeder comprising a reciprocating pusher and mechanism for causing said pusher to advance the cakes beneath said discharge orifices while material is being discharged from the receptacle onto the cakes and to be retracted while the discharge of material through said orifices is arrested, and mechanism for adjusting the throw of said supplemental feeder independently of the mechanism whereby the throw of said initial feeding mechanism is effected.

6. In a depositing machine, the combination with a receptacle for the material to be deposited and with means for delivering material from said receptacle, of superposed, relatively fixed movable steps for initially feeding and lining up cakes in front of said receptacle, a supplemental reciprocating pusher below said superposed steps, means for actuating said pusher for advancing the cakes while the material is being deposited thereon, and means for adjusting the length of throw of said supplemental pusher independently of the means whereby the throw of said movable steps is effected.

7. In a depositing machine, the combination with a receptacle for the material to be deposited, and with plunger mechanism for forcibly ejecting material from said receptacle, of means for feeding cakes beneath said receptacle, said feeder mechanism comprising an endless carrier belt, initial feeding devices for lining up the cakes in front of said orifices, a supplemental feeding device for advancing the cakes beneath said receptacle, and driving mechanism timed to cause said supplemental feeding device to advance the cakes beneath said receptacle while the material is being ejected therefrom, and means for effecting the throw of said supplemental feeding device independently of the means whereby the initial feeding of the cakes is effected.

8. In a depositing machine, the combination with a receptacle for the material to be deposited and with means for delivering material from said receptacle, of a series of superposed, relatively fixed and movable steps for initially feeding said cakes, and a supplemental reciprocating pusher below said steps, and means for actuating said pusher for advancing the rows of cakes while material is being deposited thereon.

9. In a depositing machine, the combination with a receptacle for material to be deposited and means for delivering material from said receptacle, of feeding mechanism for initially moving cakes to a position in advance of the discharge orifices of said receptacle having a lowermost reciprocating pusher, a supplemental reciprocating pusher arranged beneath the said lowermost pusher of the initial feeding mechanism to receive the cakes therefrom, and mechanism for advancing said supplemental pusher to move the cakes beneath the discharge orifices of said receptacle while material is being ejected therefrom.

10. In a depositing machine, the combination with a receptacle for material to be deposited and with means for delivering material from said receptacle, of means for initially feeding cakes in rows in advance of the discharge orifices of said receptacle, a supplemental reciprocating pusher beneath said initial feeding means for advancing the rows of cakes beneath said orifices, mechanism for actuating said supplemental pusher to advance the rows of cakes while material is being deposited thereon, and means for adjusting the movements of said supplemental pusher independently of said initial feeding mechanism.

11. In a depositing machine, the combination with a receptacle for material to be deposited, said receptacle having a series of discharge orifices, and with means for forcibly ejecting material through said discharge orifices, of intermittently operated feeding means for advancing cakes in rows to a position in front of said discharge orifices, a supplemental reciprocating pusher beneath said initial feeding means for advancing the rows of cakes beneath said orifices while material is being discharged therefrom, and mechanism for operating said supplemental pusher after the initial feeding means has reached the limit of its forward movement to position the cakes.

12. In a depositing machine, the combination with a receptacle for the material to be deposited and with means for delivering material from said receptacle, of means for initially feeding cakes in rows in front of the discharge orifices of said receptacle, a supplemental reciprocating pusher provided at its end with pockets to receive and guide the cakes, and mechanism timed to advance the rows of cakes while material is being deposited thereon, said pusher operating mechanism being independent of the mechanism that operates the initial feeding means and adjustable independently thereof.

13. In a depositing machine, the combination with a receptacle for material to be deposited and with means for delivering material from said receptacle, of means for initially feeding cakes in front of the discharge orifices of said receptacle, and a supplemental pusher beneath said feeding means for advancing rows of cakes beneath said discharge orifices, and mechanism for actuating said supplemental pusher while material is being deposited upon the cakes, said mechanism comprising a cam adjustable independently of the mechanism whereby the initial feeding means is operated.

14. In combination, depositing mechanism comprising a series of nozzles, means acting intermittently to eject material from said nozzles, and means operating intermittently to effect a relative horizontal movement between successive series of cakes and said nozzles as the material is ejected therefrom, and feeding mechanism operable during the inactive intervals of said depositing mechanism for positioning successive series of cakes in operative relation to said depositing mechanism.

15. In combination, depositing mechanism comprising a series of nozzles, means acting intermittently to eject material from said nozzles, and means operating intermittently to effect a relative horizontal movement between successive series of cakes and said nozzles as the material is ejected therefrom, feeding mechanism operable during inactive intervals of the aforesaid depositing mechanism for positioning successive series of cakes in operative relation to said depositing mechanism, and means likewise operable during said intervals to effect a relative vertical movement between said nozzles and the successive series of cakes.

16. A depositing machine comprising a series of nozzles, means acting intermittently to eject material therefrom, feeding mechanism for positioning cakes in rows below said nozzles, and means intermittently acting to advance each row of cakes relatively to said nozzles as the material is discharged therefrom, said means being adjustable to vary the operation thereof independently of said feeding mechanism.

FREDERICK WESTERMAN.